May 4, 1948.  H. PAPRITZ  2,441,031

BOWL PERIMETER

Filed Sept. 29, 1945  2 Sheets-Sheet 1

HANS PAPRITZ
INVENTOR

By [signature]
his ATTY.

May 4, 1948.  H. PAPRITZ  2,441,031
BOWL PERIMETER
Filed Sept. 29, 1945　　2 Sheets-Sheet 2

HANS PAPRITZ
INVENTOR

Patented May 4, 1948

2,441,031

UNITED STATES PATENT OFFICE 2,441,031

BOWL PERIMETER

Hans Papritz, Bern, Switzerland, assignor to Haag-Streit Werkstatten fur Prazisionsmechanik, Bern-Liebefeld, Switzerland Application September 29, 1945, Serial No. 619,355
In Switzerland November 2, 1944

6 Claims. (Cl. 88—20)

The ophthalmic apparatus known as perimeters are, as is well known, used for testing the field of vision of the human eye. For that purpose these apparatus are provided with either a cylindrical-arcuate or spherical bowl-shaped perimeter surface which is illuminated with natural or artificial light and on which, in accordance with certain rules thin physical hand projected test marks or optically projected light marks are moved relatively to the eye which is fixed on a given point of the perimeter surface. In this way it is possible to determine the boundaries of the field of vision of the eye undergoing examination and also the defects etc. in the field of vision.

The present invention renders it possible in the case of bowl perimeters with stationary projection surface to control the projector producing the light mark by purely mechanical means, in such a manner that the light mark can be projected on to any desired point of the stationary projection surface and can be moved in any direction at will.

The object of the present invention is a bowl perimeter comprising a stationary substantially hemispherical perimeter bowl having a diffusely reflecting inner surface and provided with an observation opening in its apex and with a device for producing light marks on any point of the said inner surface of said bowl, said device including a projector having a tubular rear portion rotatable about its own axis and adapted to project light entering said rear portion forwards on the said inner surface of the bowl at an oblique angle to said axis of rotation, a frame pivoted on an axis intersecting the axis through the apex of the bowl at right angles in the geometrical center of the bowl, and having a portion extending in front of and at a distance from the open side of the bowl, said projector being supported by said frame portion with the axis of its tubular portion disposed on a radius to the geometrical center of the bowl in a plane at right angles to the axis of rotation of the frame to project light towards said inner surface of said bowl, a light source and means to transmit light from said source to said tubular rear portion of said projector.

An embodiment of the object of the invention is shown in the accompanying drawing.

Figure 1:
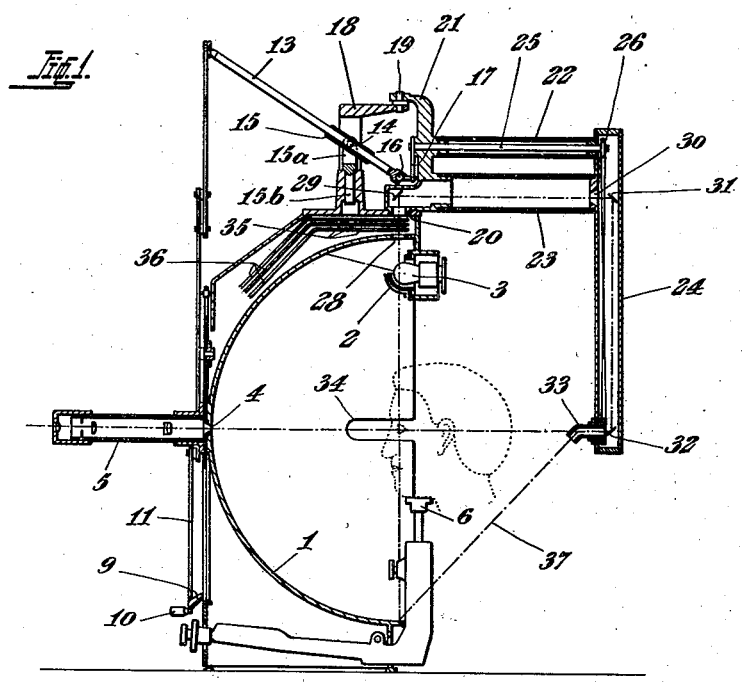
Fig. 1 is a vertical section through the instrument.

In the drawing 1 is the hemispherical perimeter bowl with matt inner surface, a part of which is illuminated direct from the lamp 3 having a shutter 2, the remaining part being illuminated by diffuse reflection. In the vertex of the hemisphere an opening 4 is provided, through which the oculist can observe the patient's eye through the telescope tube 5 fitted on the outside of the hemisphere. The patient's head rests on the chin support 6, which is so adjusted that the eye to be examined is in the centre point of the bowl and exactly opposite to the aperture 4. On the plate 7 connected with the back of the bowl 1 is an interchangeable reticular diagram 8 of the inner surface of the bowl and in front of which a handle 10 provided with a marking index 9 can be moved backwards and forward. This handle is mounted on a pantograph 11, the guide 12 of which is hingedly connected with a lever 13 resembling a connecting rod. This lever 13 passes in longitudinal direction through a sleeve 15 adapted to pivot about the spindle 14 and engages by means of a ball joint 16 in a crank 17, the spherical head of which rotates in a plane lying in the axis 19, 20.

On the upper part of the apparatus a support 18 is provided in which the sleeve 15 referred to above is adapted to pivot in a fork 15a about the horizontal axis 14 on the one hand and on the other hand about the trunnion 15b of the fork 15a. In addition, a supporting member 21 of the projection device is pivotally mounted on the support 18, namely with its upper solid part by means of a pivot 19 and with its lower, hollow part by means of a bush 20. On the supporting member 21 which, as will be seen from Fig. 1, and due to its being mounted on the pivot 19 and bush 20, is pivotal about a vertical axis passing through the centre point of the bowl 1, are secured two horizontal tubes 22 and 23 mounted one above the other and which are connected at their other ends to a vertical tube 24. Mounted in the tube 22 is the spindle 25 of the crank 17, which extends into the tube 24, where it carries the wheel 26 or a pulley drive 27. In the tube 23, which the light from the lamp 3 enters through the aperture 28, a reflecting surface 29 is provided, which reflects the light through an aperture 30 on to reflecting surfaces 31 and 32 in the tube 24.

From the reflecting surface 32 the light enters the projector 33 pivotally mounted in the lower part of the tube 24 and adapted to be rotated by the pulley drive 27. As shown in dashed lines in Fig. 1, the axis of rotation of the projector 33 is at a right angle in the centre point of the bowl, to the vertical axis of rotation of the projection device connected with the supporting member 20. The end of the projector 33, through which the light emerges, is as shown in Fig. 1, bent down in such a manner that the geometrical axis of the emerging pencil of light forms an angle with the axis of rotation of the projector and impinges on the meridian of the bowl concentric with respect to the said axis.

The projector comprises the tube 33 which is attached at its rear end to the lower part of the tube 24 at a right angle and which can be rotated about its own axis. As shown in Fig. 1, the geometric axis of the horizontal part of the projector is exactly at a right angle to the vertical rotation axis of the frame carried by pivots 19 and 20. The two axes intersect exactly in the center of the opening of the hemispherical perimeter bowl 1. The front end of the projector tube is inclined at an angle to the horizontal part of the projector. This bent part of the projector contains an optical means for deflecting the light rays coming from mirror 32 at an angle of 45° as shown at 37.

In the periphery of the bowl 1 and level with the centre point of the latter two diametrically opposite notches 34 are provided, which the projector can enter during the pivotal movement of the projection device, so that the said device can be pivoted through an angle of more than 180°.

Figure 2:
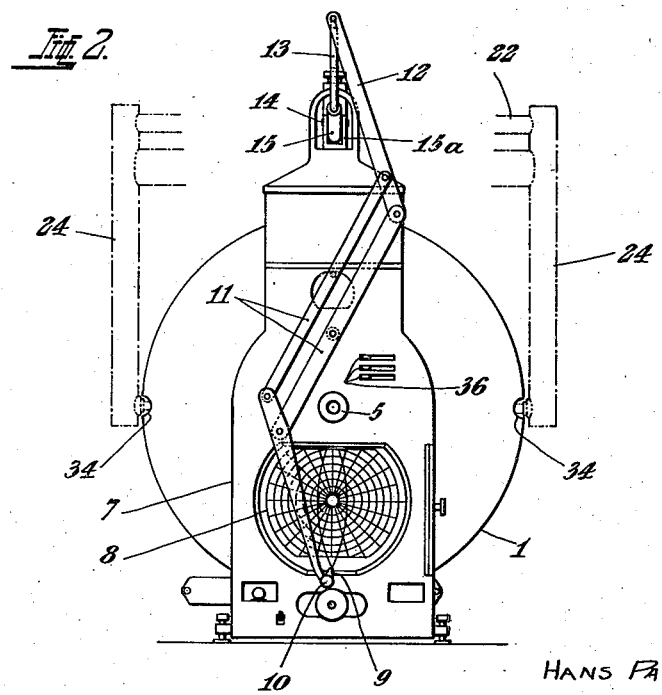
Fig. 2 is an elevation seen from the operating side.

Fig. 2 shows in dash-dotted lines the two end positions of the projection device relatively to the bowl.

Between the bowl 1 and the reflecting surface 29 are provided a plurality of light filters, for example gray filters and screens 35 which by means of the adjusting levers 36 (Fig. 2) can be inserted at will in the path of the light with the aid of an actuating device not shown in the drawing.

The mode of operation of the projection device will now be described.

When the patient has taken up a position in front of the instrument, with his chin on the support 6 and the eye to be examined directed onto the aperture 4 in the bowl 1, the oculist moves the patient's head, with a device not shown in the drawing, in such a manner that the eye is in the centre of the hemispherical bowl. By means of the control device described in the older application Ser. No. 619,354 (of September 29, 1945) and by inserting one of the filters 35, the desired ratio of brilliancy is produced between the inner surface of the bowl and the light mark produced by the projector on the said inner surface of the bowl. The light impinging on the reflecting surface 29 through the bush 20 is reflected by the reflecting surfaces 31 and 32 into the projector 33 and leaves the latter, in the position shown in Fig. 1 in the direction of the dash-dotted line 37 and forms on the inner surface of a bowl a bright round or oval patch of light, the so-called light mark.

For the purpose of testing the field of vision, the inner side of the bowl is first illuminated radially inwards with the projector 33, the patient being required to report immediately the light mark appears in his field of vision.

The boundaries of any defects found in the field of vision must then be determined separately whilst in the literature dealing with perimetry it is generally considered essential that the light mark be guided in so far as possible outwardly towards these boundaries and at a right angle thereto. This is achieved by means of the handle 10 of the pantograph 11 with the aid of the reticular diagram 8, which represents the projection of a linear reticle which does not actually exist on the inner surface of the bowl.

Figure 3:
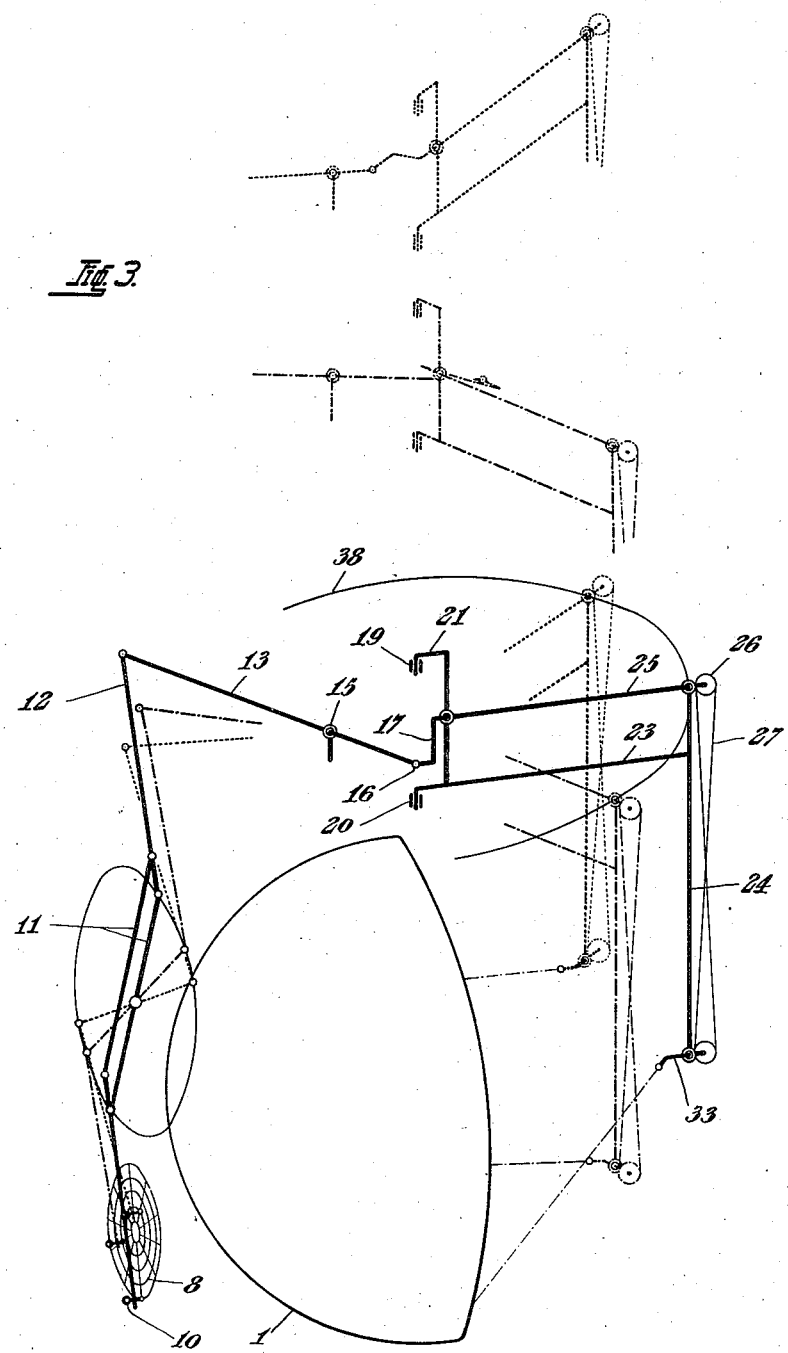
Fig. 3 is a diagrammatic representation of the actuating mechanism for the projector device.

Let us assume that the pantograph 11 and the projection device occupy the position shown in Figs. 1 and 2, which corresponds to the position drawn in full lines in Fig. 3 and that the pantograph is then turned by means of the handle 10 into the position shown in dash-dotted lines in Fig. 3.

The illustration in Fig. 3 is perspective, so that the curve 38 indicating the path of movement of the tube 24 does not appear as a circular but as an elliptical arc. In the movement in question of the pantograph, the lever 13 is so actuated by the guide 12 that on the one hand it executes a pivotal motion about the centre of the sleeve 15 and at the same time a translating movement in the latter on the other hand. At the same time the end of the lever 13 engaging on the head of the crank 16 brings about a combined movement on the projection device consisting on the one hand of a rotation of the crank 16 about its spindle 25 and on the other hand a rotary motion of the entire projection device about the axis 19, 20, in such a manner that this device comes to occupy the position shown in dash-dotted lines in Fig. 3. Through the gear 27 the rotary motion of the crank spindle 25 is transmitted to the projector 33 and thus brings about a movement of the light mark along a vertical meridian in the bowl 1, whilst the pivoting of the projection device about the vertical axis 19—20 causes a movement of the light mark along a horizontal parallel circle of the bowl.

As a result of this combined movement of the light mark in the bowl, the light mark comes to occupy the position corresponding to that of the mark index on the reticular diagram. The mass ratios of the whole gearing consisting of the lever 13, the crank 17, the spindle 25 and the axis 19—20 are so selected that the head of the lever 13 connected with the guide 12 moves substantially in one plane whilst the crank end positively describes a hemispherical curve on account of the double motion of the crank referred to above.

At the same time the effect is achieved that the image of the movements executed by the mark index on the reticular diagram is substantially an equidistant azimuthal projection of the movements of the light mark, such as is generally used for representing the field of vision.

Analogous movements are carried out by the above mentioned parts if for example the pantograph is transferred to the position shown in dotted lines in Fig. 3 relatively to the reticular diagram. During all the movements of the pantograph therefore there is a simultaneous pivoting motion of the projection device about the vertical axis 19, 20 and a rotary motion of the projector 33 about its axis at right angle to the axis 19, 20, during certain movements one of the two movement components being nil.

Accordingly, in keeping with the arbitrary settings of the marking indicator on the reticular diagram, the light mark can be projected on to any desired point of the inner surface of the bowl.

The pantograph may also be dispensed with, the marking index being mounted direct on the lever 13. In that case the reticular diagram must, of course, be located at a corresponding level on the instrument.

Moreover, the projection device may likewise be so designed that the tubes 22, 23, 24 can be dispensed with or another assemblage provided adapted to pivot about the axis 19—20.

The advantage of the present perimeter as compared with all other instruments serving the same purpose, resides in the fact that it is possible to use a hemispherical bowl instead of an arc and to guide the light mark positively with a single appropriate movement in every desired direction in the perimeter bowl. In consequence the entire field of vision of the eye under examination can be tested and those parts of the field of vision which reveal defects can be accurately determined.

What I claim is:

1. An ophthalmologic perimeter for testing the field of vision, comprising a stationary substantially hemispherical perimeter bowl having a diffusely reflecting inner surface and provided with an observation opening in its apex and a device for producing light marks on any point of the inner surface of said bowl, said device including a projector having a tubular rear portion rotatable about its own axis and adapted to project light entering said rear portion forwards at an oblique angle to said axis of rotation, a frame pivoted on an axis intersecting the axis through the apex of the bowl at right angles in the geometrical center of the bowl, and having a portion extending in front of and at a distance from the open side of the bowl, said projector being supported by said frame portion with the axis of its tubular portion disposed on a radius to the geometrical center of the bowl in a plane at right angles to the axis of rotation of the frame to project light towards said inner surface of said bowl, a light source and means to transmit light from said source to said tubular rear portion of said projector.

2. An ophthalmologic perimeter, as claimed in claim 1, wherein the light is projected from said projector at an angle relative to such axis of rotation which is substantially equal to the apex angle of an imaginary cone having its base coinciding with the periphery of the bowl and its apex located at the front end of the tubular part of said projector when the latter is positioned on the axis through the apex of the bowl.

3. An ophthalmologic perimeter, as claimed in claim 1, comprising a crank gear carried by said frame and rotatable about an axis parallel to the axis of rotation of said projector, a guide pivoted for universal movement on a support rigid with said bowl, a manually controlled lever passing through said guide and being pivotally movable therewith and axially movable therein, one end of said lever being connected to said crank gear so as to produce pivotal movements of said frame, and rotary movements of said crank gear, and means carried by said frame to transmit the rotary movements of said crank gear to the tubular rear portion of said projector.

4. An ophthalmic perimeter as claimed in claim 1, including an operating handle mounted on the closed side of the bowl for displacement in a given plane, and a link mechanism connecting said handle to said frame and including means to transmit movement of said handle to said frame and projector whereby the light mark produced by the projector on the inner surface of the bowl is displaced in function of the movement of said handle.

5. An ophthalmic perimeter as claimed in claim 1, including an operating handle mounted on the closed side of the bowl for displacement in a given plane, and a link mechanism connecting said handle to said frame and including a pantograph and means to transmit movements of said handle through said pantograph to said frame and projector whereby the light mark produced by the projector on the inner surface of the bowl is displaced in function of the movement of said handle, and means permitting the marking, for every position of the handle, the corresponding position of the light mark on the inner surface of the bowl.

6. An ophthalmic perimeter, as claimed in claim 1, including a lamp mounted inside said bowl near its rim and on the axis of rotation of said frame, a reflector screen for said lamp to throw the light of the latter onto the adjacent rim portion of the bowl to obtain a uniformly diffuse illumination of the inner bowl surface and also through a hole aligned with said axis of rotation of said frame, and an optical arrangement carried by said frame to deflect the light passing through said hole into the tubular rear portion of said projector.

HANS PAPRITZ.

REFERENCES CITED

The following references are of record in the file of this patent:

UNITED STATES PATENTS

| Number | Name | Date |
|---|---|---|
| 785,439 | Sayen | Mar. 21, 1905 |
| 1,022,270 | Sciamengo | Apr. 2, 1912 |
| 1,795,752 | Bauersfeld et al. | Mar. 10, 1931 |
| 1,942,850 | Tillyer | Jan. 9, 1934 |
| 2,374,854 | Feinbloom | May 1, 1945 |